2,820,737
WATER SOLUBLE STEROIDS

Gerald D. Laubach, Jackson Heights, N. Y., assignor to Chas. Pfizer & Co., Inc., New York, N. Y., a corporation of Delaware No Drawing. Application May 16, 1955
Serial No. 508,803

3 Claims. (Cl. 167—52)

This invention is concerned with certain novel steroid compounds and in particular with certain novel steroids which are hormonally inactive and useful as central nervous system depressants. This application is a continuation-in-part of application Serial No. 480,614, filed on January 7, 1955, by Gerald D. Laubach (issued May 17, 1955 as U. S. Patent 2,708,651).

The compounds of the present invention are those having the following general formula

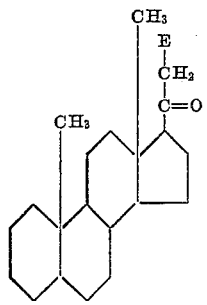

This formula includes both compounds of the pregnane series and also compounds of the allopregnane series. In this formula E is used to denote an ionic ester group as that group is defined in the parent application.

In the above mentioned parent application, there were described and claimed compounds having the general formula

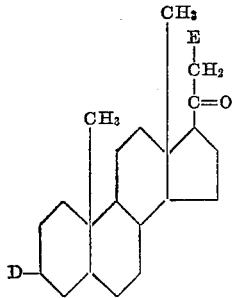

in which E is selected from the group consisting of ionic ester groups having the formula

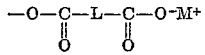

and ionic ester groups having the formula

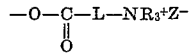

wherein L is chosen from the group consisting of $-(CH_2)_n-$, $-O-(CH_2)_n-$ and $-NH-(CH_2)_n-$, $n$ being a number from 1 to 6, $M^+$ is a cation selected from the class consisting of $Na^+$, $K^+$ and $NR_4^+$, each R represents a member of the group consisting of hydrogen and alkyl, hydroxyalkyl, hydrocarbon carboxyalkyl, aminoalkyl, aryl and aralkyl groups, each containing up to ten carbon atoms, and $Z^-$ is a pharmacologically acceptable anion. D in this formula may be keto.

The compounds of the present invention are prepared by methods similar to those used in preparing the compounds in the parent application. It will be observed that the parent application describes compounds containing a keto group at the 3-position. The present compounds are prepared by removal of this 3-keto group. To accomplish this removal, 21-hydroxypregnane-3, 20-dione or 21-hydroxyallopregnane-3, 20-dione with an acyl group present at the 21-position is converted to a 3-thioketal. This is accomplished by reaction with, for example, ethane dithiol and an acid catalyst as described in copending application Serial No. 508,802, filed May 16 1955, now abandoned, by Gerald D. Laubach. The thioketal is then treated with Raney nickel in an amount which may range from a stoichiometric equivalent to ten-fold excess. The temperature used for this reaction may vary anywhere from 20–100° C. and the time required will vary from 1 to 12 hours. An inert organic solvent, for example, alcohol or dioxane, or mixture thereof, is employed. This treatment with Raney nickel removes the thioketal group and results in the formation of a completely hydrogenated 3-position.

The acyl group which has been present during the above reactions is then removed by hydrolysis, for example with potassium carbonate in methanol thereby producing the free 21-position alcohol which is then converted to an ionic ester at the 21-position as described in the parent application. If it is desired to prepare ionic ester groups which are succinates, the succinate group may be used as the original acylating group and carried through the above synthesis.

The novel compounds of this present invention have properties which make them very valuable. Each has the three characteristics of being water soluble, hormonally inactive and active as a central nervous system depressant. They are useful as anesthetic, anti-convulsant, sedative, analgesic and hypnotic agents. They may be employed alone or in combination with other central nervous system depressants. Their water solubility is such that they may be administered intravenously in sterile aqueous solution. Filtration through a Seitz filter is a convenient method of sterilizing a solution to be injected. The compounds may also be employed in aqueous solutions containing other solutes, for example enough saline or glucose to make them isotonic. They are also suitable for administration by other routes, for example, orally, subcutaneously, and intramuscularly. The compounds may be combined with a variety of pharmacologically acceptable carriers, the choice of which will depend upon the desired method of administration and be determined by standard pharmaceutical practice; for example, the compounds may be administered orally in the form of tablets containing an excipient such as starch, or as an elixir or suspension in a carrier.

The following examples are given solely for the purpose of illustration and are not to be construed as limitations of this invention, many variations of which are possible without departing from the spirit or scope thereof.

Example I

Two grams of 21-hydroxypregnane-3, 20-dione sodium hemisuccinate was added to an equivalent amount of ethane dithiol. The mixture was cooled below 0° C. with an ice salt mixture. A current of gaseous hydrogen chloride was passed through for three minutes and the mixture was then stirred in a refrigerator for 14 hours. The excess ethane dithiol was removed in a vacuum desiccator in the presence of sodium hydroxide. The solid product, the 3-ethylene thioketal of 21-hydroxypregnane 3, 20-dione hemisuccinate was recovered.

This compound was then treated with a five-fold excess amount of Raney nickel at 60° C. in an ethanol-oxane mixture for a period of 4 hours. The filtered solution was evaporated to dryness and the crude solid residue was recrystallized from ethanol. The product was 21-hydroxypregnane-20-one hemisuccinate. It was acted with aqueous sodium bicarbonate and 21-hydroxypregnane-20-one-sodium hemisuccinate obtained by freeze drying the solution.

*Example II*

By the use of procedures analogous to the above, identical results are obtained when allo compounds are used, since the configuration at the 5-position has no influence in the course of these reactions. Identical results were also obtained when the 21-position was protected with other acyl groups, for example, the acetate or benzoate. In these latter cases, however, it was necessary to remove the protecting acyl group before proceeding to introduce the ionic ester group. This removal of the acyl group was readily accomplished by treatment with alcoholic potassium carbonate.

What is claimed is:

1. A compound having the formula

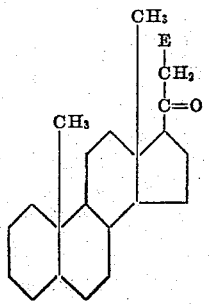

in which E is selected from the group consisting of ionic ester groups having the formula

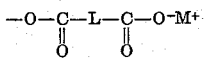

and ionic ester groups having the formula

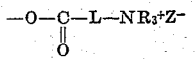

wherein L is chosen from the group consisting of $-(CH_2)_n-$, $-O-(CH_2)_n-$ and $-NH-(CH_2)_n-$, $n$ being a number from 1 to 6, $M^+$ is a cation selected from the class consisting of $Na^+$, $K^+$ and $NR_4^+$, each R represents a member of the group consisting of hydrogen and alkyl, hydroxyalkyl, hydrocarbon carboxyalkyl, aminoalkyl, aryl and aralkyl groups, each containing up to ten carbon atoms, and $Z^-$ is a pharmacologically acceptable anion.

2. A pharmaceutical composition which comprises a compound as claimed in claim 1 together with a pharmaceutically acceptable carrier.

3. An anesthetic agent comprising a sterile, injectable aqueous solution of a compound as claimed in claim 1.

No references cited.